(12) United States Patent
Nishimaki

(10) Patent No.: US 12,621,475 B2
(45) Date of Patent: May 5, 2026

(54) IMAGING DEVICE, NON-TRANSITORY STORAGE MEDIUM, AND ENCODER SELECTION METHOD

(71) Applicant: JVCKENWOOD Corporation, Yokohama (JP)

(72) Inventor: Keiji Nishimaki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 369 days.

(21) Appl. No.: 18/321,032

(22) Filed: May 22, 2023

(65) Prior Publication Data

US 2023/0291919 A1      Sep. 14, 2023

Related U.S. Application Data

(63) Continuation of application No. PCT/JP2021/041951, filed on Nov. 15, 2021.

(30) Foreign Application Priority Data

Dec. 15, 2020      (JP) ................................. 2020-207926

(51) Int. Cl.
*H04N 19/42*            (2014.01)
*H04N 19/127*          (2014.01)
            (Continued)

(52) U.S. Cl.
CPC ........... *H04N 19/42* (2014.11); *H04N 19/127* (2014.11); *H04N 19/136* (2014.11); *H04N 19/184* (2014.11)

(58) Field of Classification Search
CPC .... H04N 19/42; H04N 19/127; H04N 19/136; H04N 19/184
See application file for complete search history.

(56) References Cited

U.S. PATENT DOCUMENTS 6,665,872 B1 * 12/2003 Krishnamurthy .... H04N 19/159
                                                              375/E7.218
8,873,640 B2 * 10/2014 Washino .......... G11B 20/10527
                                                              375/240.26
(Continued)

FOREIGN PATENT DOCUMENTS

JP          2000-354240          12/2000
JP          2007-116604          5/2007

OTHER PUBLICATIONS

International Search Report and Written Opinion for International Application No. PCT/JP2021/041951 mailed on Jan. 25, 2022, 8 pages.

*Primary Examiner* — Stephen R Koziol
(74) *Attorney, Agent, or Firm* — Amin, Turocy & Watson, LLP

(57)            ABSTRACT

An imaging device includes an imager; a first-type encoder; a connector unit; an information acquiring unit for acquiring information on an encoder operation mode from a second-type encoder connected to the connector unit; and a selecting unit for selecting an encoder for a record purpose and an encoder for a distribution purpose, wherein the information on the encoder operation mode contains a low-delay mode and an image quality priority mode in which an image quality is given higher priority but an encoding delay is longer than those in the low-delay mode, and the selecting unit is configured to: select, when the information on the encoder operation mode indicates the image quality priority mode, the second-type encoder for the record purpose; and select, when the information on the encoder operation mode indicates the low-delay mode, the first-type encoder for the record purpose and the second-type encoder for the distribution purpose.

5 Claims, 4 Drawing Sheets

(51) Int. Cl.
    *H04N 19/136*     (2014.01)
    *H04N 19/184*     (2014.01)

(56)             References Cited

U.S. PATENT DOCUMENTS

| | | | | |
|---|---|---|---|---|
| 10,021,426 | B2 * | 7/2018 | Hu | H04N 19/67 |
| 10,602,170 | B2 * | 3/2020 | Chen | H04N 5/765 |
| 2003/0025789 | A1 | 2/2003 | Saito et al. | |
| 2013/0050393 | A1 * | 2/2013 | Chen | H04N 19/42 |
| | | | | 348/E7.078 |
| 2013/0101052 | A1 * | 4/2013 | Kaye | H04N 19/154 |
| | | | | 375/240.26 |
| 2014/0334553 | A1 * | 11/2014 | Novotny | H04N 19/177 |
| | | | | 375/240.26 |

* cited by examiner

FIG.3

IMAGING DEVICE, NON-TRANSITORY STORAGE MEDIUM, AND ENCODER SELECTION METHOD

CROSS-REFERENCE TO RELATED APPLICATIONS

This application is a Continuation of PCT International Application No. PCT/JP2021/041951 filed on Nov. 15, 2021 which claims the benefit of priority from Japanese Patent Application No. 2020-207926 filed on Dec. 15, 2020, the entire contents of both of which are incorporated herein by reference.

FIELD OF THE INVENTION

The present invention relates to an imaging device, a non-transitory storage medium, and an encoder selection method.

BACKGROUND OF THE INVENTION

There is a case in which image data representing data of image imaged by an imaging device is compressed by an encoder to be stored. Japanese Patent Application Laid-open No. 2007-116604 discloses an encoder device that includes multiple encoders and switches them for compressing the image data.

Meanwhile, if another encoder can be additionally attached to an imaging device that includes an encoder, a high-grade encoder developed accompanying advancement in technology can be installed additionally, and convenience of user can be improved.

When another detachable encoder is additionally attached to an imaging device that includes an encoder, a technology or an imaging device which can appropriate switching the encoders according to a use scene of a user is required.

An imaging device, a non-transitory storage medium, and an encoder selection method are disclosed.

SUMMARY OF THE INVENTION

According to one aspect of the present application, there is provided an imaging device comprising: an imager configured to capture images; a first-type encoder configured to compress image data of the images captured by the imager; a connector unit to which a second-type encoder is connectible; an information acquiring unit configured to acquire, when the second-type encoder is connected to the connector unit, encoder information which contains at least information on the second-type encoder from the second-type encoder; and a selecting unit configured to select, based on the encoder information acquired by the information acquiring unit, an encoder used for a record purpose and an encoder used for a distribution purpose from among the first-type encoder and the second-type encoder, wherein the encoder information contains at least one of: information related to an encoder operation mode; information related to a video format; and information related to an encoder switching method, wherein the information related to the encoder operation mode contains a low-delay mode and an image quality priority mode in which an image quality is given higher priority than that in the low-delay mode but an encoding delay is longer than that in the low-delay mode, and the selecting unit is further configured to: select, when the information related to the encoder operation mode for the second-type encoder indicates the image quality priority mode, the second-type encoder as the encoder used for the record purpose; and select, when the information related to the encoder operation mode for the second-type encoder indicates the low-delay mode, the first-type encoder as the encoder used for the record purpose and the second-type encoder as the encoder used for the distribution purpose.

According to one aspect of the present application, there is provided a non-transitory storage medium that stores a computer program that causes a computer to execute: acquiring, when a second-type encoder is connected to an imaging device that includes a first-type encoder, encoder information containing at least information on the second-type encoder from the second-type encoder, and selecting, based on the encoder information, an encoder used for a record purpose and an encoder used for a distribution purpose from among the first-type encoder and the second-type encoder, wherein the encoder information contains at least one of: information related to an encoder operation mode; information related to a video format; and information related to an encoder switching method, wherein the information related to the encoder operation mode contains a low-delay mode and an image quality priority mode in which an image quality is given higher priority than that in the low-delay mode but an encoding delay is longer than that in the low-delay mode, and at the selecting, selecting, when the information related to the encoder operation mode for the second-type encoder indicates the image quality priority mode, the second-type encoder as the encoder used for the record purpose; and selecting, when the information related to the encoder operation mode for the second-type encoder indicates the low-delay mode, the first-type encoder as the encoder used for the record purpose and the second-type encoder as the encoder used for the distribution purpose.

According to one aspect of the present application, there is provided an encoder selection method comprising: acquiring, when a second-type encoder is connected to an imaging device that includes a first-type encoder, encoder information containing at least information on the second-type encoder from the second-type encoder, and selecting, based on the encoder information, an encoder used for a record purpose and an encoder used for a distribution purpose from among the first-type encoder and the second-type encoder, wherein the encoder information contains at least one of: information related to an encoder operation mode; information related to a video format; and information related to an encoder switching method, wherein the information related to the encoder operation mode contains a low-delay mode and an image quality priority mode in which an image quality is given higher priority than that in the low-delay mode but an encoding delay is longer than that in the low-delay mode, and at the selecting, selecting, when the information related to the encoder operation mode for the second-type encoder indicates the image quality priority mode, the second-type encoder as the encoder used for the record purpose; and selecting, when the information related to the encoder operation mode for the second-type encoder indicates the low-delay mode, the first-type encoder as the encoder used for the record purpose and the second-type encoder as the encoder used for the distribution purpose.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 3 is a diagram that schematically illustrates a flow of data in the imaging device according to the embodiment.

DETAILED DESCRIPTION OF THE INVENTION

Exemplary embodiments of the present invention are described below in detail with reference to the accompanying drawings. However, the present invention is not limited to the embodiments described below.

Configuration of Imaging Device

Figure 1:
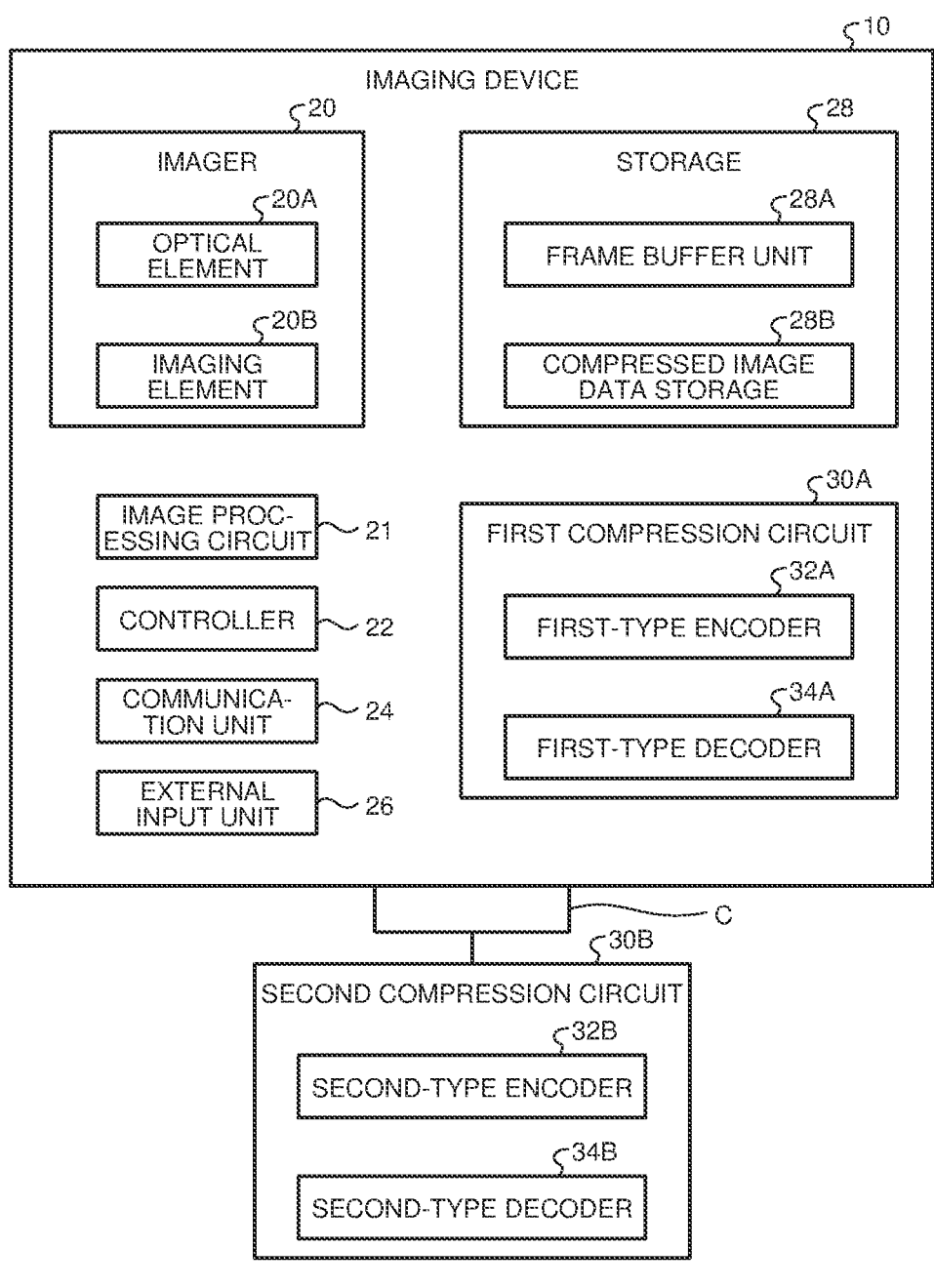
FIG. 1 is a schematic block diagram of an imaging device according to an embodiment.

FIG. 1 is a schematic block diagram of an imaging device according to the embodiment. As illustrated in FIG. 1, an imaging device 10 includes an imager 20, an image processing circuit 21, a controller 22, a communication unit 24, an external input unit 26, a storage 28, a first compression circuit 30A, and a connector unit C.

The imaging device 10 is a device for capturing images. Moreover, the imaging device 10 compresses captured image data P by an encoder, and generates compressed image data Q.

The imager 20 includes an optical element 20A and an imaging element 20B. The optical element 20A is an element such as a lens, a mirror, a prism, or a filter that constitutes an optical system. The imaging element 20B converts light, which is incident via the optical element 20A, into an image signal representing an electrical signal. Examples of the imaging element 20B include a CCD sensor (CCD stands for Charge Coupled Device) and a CMOS sensor (CMOS stands for Complementary Metal Oxide Semiconductor).

The image processing circuit 21 generates frame-by-frame image data P from the image signal generated by the imaging element 20B. The image data P contains, for example, information about a luminance or a color of each pixel in a single frame, and may contain a pixel-by-pixel gradation assigned thereto. The image processing circuit 21 can be implemented as software using a computer program, or can be implemented as hardware using a digital circuit. Alternatively, the image processing circuit 21 can be implemented as hardware using a field programmable gate array (FPGA).

The controller 22 controls the constituent elements of the imaging device 10. The controller 22 is an arithmetic device such as a central processing unit (CPU). A CPU sequentially reads sequences of commands called computer programs, interprets/executes the computer programs, and performs information processing. The controller 22 implements its functions by reading computer programs from the storage 28 (explained later) and performing arithmetic processing in the CPU. Regarding the functions of the controller 22, the explanation is given later.

The communication unit 24 is a communication module by which the imaging device 10 performs communication with an external device such as an image processing device. The communication unit 24 perform communications with an external device by wireless communication or wired communication. In a case of wireless communication, a communication antenna, a radio frequency (RF) circuit, and other communication processing circuits can be included. In a case of wired communication, for example, a LAN terminal (LAN stands for Local Area Network), a transmission circuit, and other communication processing circuits can be included.

The external input unit 26 acquires input information by a user from an outside of the imaging device 10. The external input unit 26 bay be connected to, for example, a liquid crystal display (LCD), a graphical user interface (GUI) may be displayed on the LCD screen, and input information by a user may be acquired by receiving a user input. Alternatively, the external input unit 26 can be switches installed in the imaging device 10. In that case, information related to the user input may be acquired by acquiring information for a state of the switch operated by the user by the external input unit 26.

In the present embodiment, encoder information is input to the external input unit 26 by a user. The encoder information represents information related to a encoder. In the present embodiment, the encoder information represents information related to an encoder operation mode, information related to a video format, and information related to an encoder switching method. Alternatively, the encoder information can represent at least one of the information related to the encoder operation mode, the information related to the video format, and the information related to the encoder switching method. The encoder information contains at least information regarding a second-type encoder 32B (for example, information related to an encoder operation mode of the second-type encoder 32B or information related to a video format of the second-type encoder 32B). Alternatively, the encoder information can contain information regarding a first-type encoder 32A as well as regarding the second-type encoder 32B. That is, the external input unit 26 may acquire the information related to the operation mode, the information related to the video format, and the information related to the encoder switching method for the first-type encoder 32A and the second-type encoder 32B as the encoder information.

In this way, the encoder information is set by the user input to the external input unit 26. However, the encoder information need not be set by the user. Alternatively, for example, the encoder information can be set in advance. In that case, for example, the encoder information regarding the first-type encoder 32A can be set in advance and stored in the storage 28. Moreover, for example, the encoder information regarding the second-type encoder 32B can be stored in the storage of a second compression circuit 30B.

The information related to the encoder operation mode represents information related to an operation state of the encoder that is defined by a reference frame count when the encoder runs. The reference frame count represents a number of frames used for an inter-frame prediction. Thus, the reference frame count becomes larger, a memory capacity for compression is more required, and a decoding becomes more complicated. At the same time, an image quality is improved.

The encoder operation mode can be defined to be either an image quality priority mode or a low-delay mode according to the reference frame count. In the image quality priority mode, the reference frame count for the inter-frame prediction is large, an encoding period is long, and a delay is long, but compressed image data has excellent image quality. In the low-delay mode, the reference frame count for the inter-frame prediction is small, the encoding period is short, and the delay is short. That is, in the image quality priority mode, the image quality is better than the image quality in the low-delay mode, but the delay is longer than the delay in the low-delay mode. On the other hand, in the low-delay mode, the image quality is lesser than the image quality in the image quality priority mode, and the delay is shorter than the delay in the image quality priority mode.

The information related to the video format represents information related to at least one of a video format and a bitrate of the compressed image data generated when the image data is compressed by the encoder. The video format implies a video standard defined according to a screen aspect ratio and a resolution of the image data. The bitrate implies a volume of data that can be transmitted and received in one second. Fundamentally, as the bitrate becomes higher, the image quality becomes better. Meanwhile, the video format of the compressed video data, which can be generated in the encoder, and the bitrate corresponding to the video format is decided according to the type of the encoder.

Table 1 shows an example of the video formats and the bitrates corresponding to the video formats. For example, when the video format for the compressed image data is selected by the user, the bitrate corresponding to the selected video format gets selected.

TABLE 1

| Video format | Bitrate |
|---|---|
| 4K | 64 Mbps to 8 Mbps |
| 1080 p | 24 Mbps to 500 Kbps |
| 720 p | 12 Mbps to 100 Kbps |

The information related to the encoder switching method represents information related to an encoder used for a record purpose and information related to an encoder used for a distribution purpose. Herein, record implies storing the compressed image data compressed by an encoder in a compressed image data storage 28B of the storage 28 in the imaging device 10. Distribution implies transmitting the compressed image data compressed by an encoder to an external device via the communication unit 24. For example, the encoder switching method can be defined as illustrated in Table 2 in which the encoder used for the record purpose and the encoder used for the distribution purpose are decided in advance.

TABLE 2

| Encoder switching method | Record | Distribution |
|---|---|---|
| Encoder switching method A | Second-type encoder | First-type encoder |
| Encoder switching method B | First-type encoder | Second-type encoder |
| Encoder switching method C | Second-type encoder | Second-type encoder |

In an encoder switching method A illustrated in Table 2, the first-type encoder is replaced by the second-type encoder used for the record purpose, and the first-type encoder is used for the distribution purpose without any change. In an encoder switching method B illustrated in Table 2, the first-type encoder is used for the record purpose without any change, and the first-type encoder is replaced by the second-type encoder used for the distribution purpose. In an encoder switching method C illustrated in Table 2, the first-type encoder is replaced by the second-type encoder used for the record purpose as well as for the distribution purpose.

For example, when an encoder with a low bitrate is used for the distribution purpose, the distribution of the compressed image data can be smoothly carried out with only a small delay. The user can select a desired switching method from among multiple encoder switching methods. Alternatively, instead of the selection of the switching method by the user, the imaging device 10 can be configured to select the encoder switching method. Meanwhile, the encoder switching methods are not limited to be defined as illustrated in Table 2, and can be defined in an arbitrary manner.

When a second-type encoder is connected to the imaging device 10, the external input unit 26 prompts the user to input encoder information on the second-type encoder. Thus, the external input unit 26 prompts the user to select the encoder operation mode of the second-type encoder, and then acquires the encoder operation mode input by the user. After acquiring the encoder operation mode input by the user, the external input unit 26 prompts the user to select the video format of the second-type encoder, and then acquires the video format input by the user. After acquiring the video format input by the user, the external input unit 26 prompts the user to select the bitrate corresponding to the video format, and then acquires the bitrate input by the user. After acquiring the bitrate input by the user, the external input unit 26 prompts the user to select the encoder switching method, and then acquires the encoder switching method input by the user. In this way, in the present embodiment, when the second-type encoder is connected to the imaging device 10, the encoder information regarding the second-type encoder is input to the external input unit 26. However, that is not the only possible case. Alternatively, for example, the encoder information regarding the second-type encoder can be stored in advance in a storage of the second-type encoder 32B. In that case, the encoder information need not be specifically input to the external input unit 26. That is, when the second-type encoder 32B which is intended to be detachable and has encoder information on the second-type encoder stored in a storage thereof is connected, the selection of the encoder switching method by the user can be skipped.

The storage 28 is a memory device used to store the image data P captured by the imager 20, the compressed image data Q acquired by compression of the image data P, and computer programs (software) executed by the controller 22. The storage 28 includes a frame buffer unit 28A and a compressed image data storage 28B. The storage 28 has a main memory device and an auxiliary memory device. As the main memory device, it is possible to use a temporary storage such as a read only memory (ROM) or a random access memory (RAM). As the auxiliary memory device, it is possible to use a hard disk drive (HDD) or a solid state drive (SSD).

The frame buffer unit 28A is a memory area or a memory device in which the image data P, which is generated by the image processing circuit 21, is temporarily stored. As the frame buffer unit 28A, either it is possible to secure a dedicated area in some part of a random access memory (RAM) functioning as the main memory device, or it is possible to use a dedicated memory device different from the main memory device. An image data acquiring unit 42 of the controller 22 (see FIG. 2) sequentially stores sets of the image data P in the frame buffer unit 28A while the imager 20 captures the images. When a new set of the image data P in time series is acquired from the image processing circuit 21, the image data acquiring unit 42 deletes, from the frame buffer unit 28A, the oldest set of the image data P in time series stored in the frame buffer unit 28A, and newly stores the new set of the image data P in time series in the frame buffer unit 28A. In this way, a constant number of sets of the image data P stored in the frame buffer unit 28A is maintained, thereby enabling avoiding shortage in a memory capacity due to an increase in the number of sets of the image data P stored in the frame buffer unit 28A.

The compressed image data storage 28B is used to store the compressed image data compressed by the encoder. That is, in the imaging device 10, the compressed image data storage 28B is used for recording the compressed image data. Meanwhile, the compressed image data storage 28B can be implemented using an auxiliary memory device of the storage 28.

The first compression circuit 30A compresses the image data P. The first compression circuit 30A includes the first-type encoder 32A and a first-type decoder 34A. The first-type encoder 32A compresses the image data P and generates compressed image data. Herein, the first-type encoder 32A compresses the image data P according to a first compression method. The first compression method implemented by the first-type encoder 32A can be an arbitrary method. For example, a compression method based on H.264 standard can be implemented. H.264 standard is one of the video compression standards, and assumedly has a wide range of application starting from the low bitrate application such as in cellular phones to the high bitrate application such as in the HDTV class. The first-type encoder 32A can be implemented as a software encoder based on software, or can be implemented as a hardware encoder based on hardware.

The first-type decoder 34A decodes the compressed image data. The first-type decoder 34A decodes the compressed image data, which was compressed according to the first compression method, and generates the image data P. The first-type decoder 34A can be implemented as a software decoder based on software, or can be implemented as a hardware decoder based on hardware. In the present embodiment, the first compression circuit 30A having the first-type encoder 32A and the first-type decoder 34A embedded therein constitutes a single hardware component. Alternatively, the first-type encoder 32A and the first-type decoder 34A can be configured as separate hardware components.

The connector unit C is a connecting portion (terminal) for connecting an external device to the imaging device 10. The connector unit C includes a video signal line and a control signal line. The control signal line can be, for example, a USB connection terminal (USB stands for Universal Serial Bus), and, when a higher transmission speed is required, a connection terminal according to a transmission speed thereof can be selected. The video signal line can be, for example, a serial digital interface (SDI). For example, the imaging device 10 can connect to the second compression circuit 30B via the connector unit C. That is, the imaging device 10 can switch between connecting to and disconnecting from the second compression circuit 30B. Meanwhile, there is a risk that, against the user's will, the connection of the second compression circuit 30B may easily drop out. Thus, it is desirable that the connection unit C is included inside a housing of the imaging device 10 and, when the second compression circuit 30B is connected to the connection unit C, the second compression circuit 30B is housed inside the housing of the imaging device 10. As a result, even if the second compression circuit 30B drops out of the connector unit C, it becomes possible to prevent a situation of losing the second compression circuit 30B.

Second Compression Circuit

The second compression circuit 30B compresses the image data P. The second compression circuit 30B includes the second-type encoder 32B and a second-type decoder

34B. Moreover, the second compression circuit 30B may also include a storage for storing encoder information of the second-type encoder 32B.

The second-type encoder 32B compresses the image data P and generates compressed image data. Herein, the second-type encoder 32B compresses the image data P according to a second compression method that is different from the first compression method. The second compression method by the second-type encoder 32B can be an arbitrary method. For example, a compression method based on H.265 standard can be implemented. H.265 standard is one of the successor video compression standards to H.264 standard, and has twice a compression capability than H.264 standard. That is, in order to achieve the same image quality, only half or less of the bitrate is sufficient. A lower bitrate is advantageous in distribution via a low-bandwidth network.

The second-type encoder 32B may be implemented as a hardware encoder based on hardware. The second-type encoder 32B includes a control signal line connectible to the control signal line of the connector C of the imaging device 10. That is, when the control signal line of the connector C of the imaging device 10 is a USB connection terminal, the control signal line of the second-type encoder 32B also is a USB connection terminal.

The second-type decoder 34B decodes the compressed image data. Herein, the second-type decoder 34B decodes the compressed image data compressed by the second compression method, and generates the image data P. In the present embodiment, the second compression circuit 30B having the second-type encoder 32B and the second-type decoder 34B embedded therein constitutes a single hardware component. Alternatively, the second-type encoder 32B and the second-type decoder 34B can be configured as separate hardware components.

Configuration and Operation Details of Controller

Figure 2:
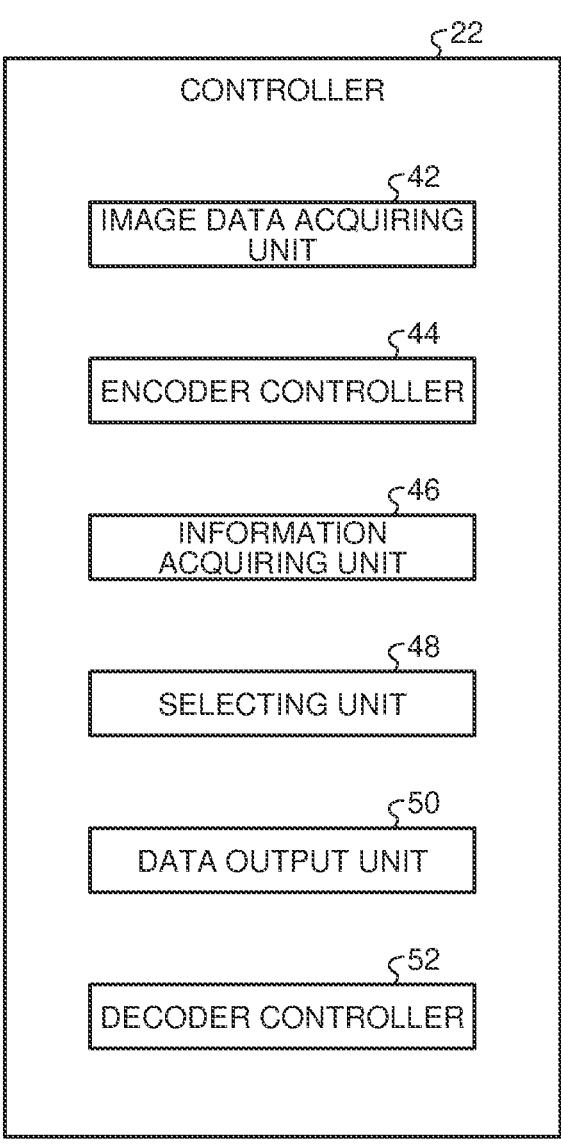
FIG. 2 is a schematic block diagram of a controller of the imaging device according to the embodiment.

Given below is an explanation of a configuration and operation details of the controller 22. FIG. 2 is a schematic block diagram of the controller according to the embodiment.

As illustrated in FIG. 2, the controller 22 includes the image data acquiring unit 42, an encoder controller 44, an information acquiring unit 46, a selecting unit 48, a data output unit 50, and a decoder controller 52. The controller 22 reads computer programs (software) from the storage 28 and executes them so as to implement functions of the constituent elements and to execute processes of the constituent elements. The controller 22 can execute the processes of the constituent elements using a single CPU. Alternatively, the controller 22 can include multiple CPUs and can execute the processes of the constituent elements using those CPUs. Meanwhile, at least some of the image data acquiring unit 42, the encoder controller 44, the information acquiring unit 46, the selecting unit 48, the data output unit 50, and the decoder controller 52 can be implemented by a hardware circuit.

When a new set of image data P in time series is acquired from the image processing circuit 21, the image data acquiring unit 42 deletes, from the frame buffer unit 28A, the oldest set of image data P in time series stored in the frame buffer unit 28A, and newly stores the new set of image data P in time series in the frame buffer unit 28A.

The encoder controller 44 controls the encoder of the imaging device 10 and makes the encoder compress the image data P. The encoder controller 44 functions as a first-type encoder controller and controls the first-type encoder 32A for making it compress the image data P. Moreover, the encoder controller 44 functions as a second-type encoder controller and controls the second-type encoder 32B for making it compress the image data P. Meanwhile, for example, in the first-type encoder 32A or the second-type encoder 32B, a CPU can be embedded for compressing the image data P.

The information acquiring unit 46 acquires encoder switching information and encoder type information. Moreover, the information acquiring unit 46 acquires the encoder information. The encoder switching information indicates that the image data P is compressible by the encoders connected to the imaging device 10. Meanwhile, when the second compression circuit 30B that includes the second-type encoder 32B is connected to the connector unit C, it is determined that the image data P is now compressible by the second-type encoder 32B. The encoder type information is, for example, information related to the compression method of the encoder, such as H.264 standard.

In the present embodiment, the information acquiring unit 46 detects that the second-type encoder 32B has been connected to the imaging device 10, and acquires, as the encoder switching information, information indicating that the second-type encoder 32B has been connected to the imaging device 10. Moreover, after acquiring the information indicating that the second-type encoder 32B has been connected, the information acquiring unit 46 acquires the encoder type information related to the type of the second-type encoder 32B and acquires the encoder information. When the encoder information is input to the external input unit 26, the information acquiring unit 46 acquires the encoder information input to the external input unit 26. On the other hand, if the encoder information is not input to the external input unit 26, then, for example, the information acquiring unit 46 reads the encoder information on the first-type encoder 32A from the storage 28 and reads the encoder information on the second-type encoder 32B from a storage (not shown in FIG. 1) of the second-type encoder 32B.

Based on the encoder switching information, the encoder type information, and the encoder information acquired by the information acquiring unit 46, the selecting unit 48 selects an encoder used for the record purpose and selects an encoder used for the distribution purpose. A procedure for selecting the encoder used for the record purpose and the encoder used for the distribution purpose by the selecting unit 48 is explained later.

The data output unit 50 outputs the compressed image data Q, which is generated by compressing the image data P by the encoder, to an external device via the communication unit 24. That is, in the imaging device 10, the data output unit 50 is used for delivering the compressed image data Q.

The decoder controller 52 makes the first-type decoder 34A decode the compressed image data as a first-type decoder controller, and makes the second-type decoder 34B decode the compressed image data as a second-type decoder controller.

Flow of Processes for Record and Distribution in Imaging Device

Figure 3:
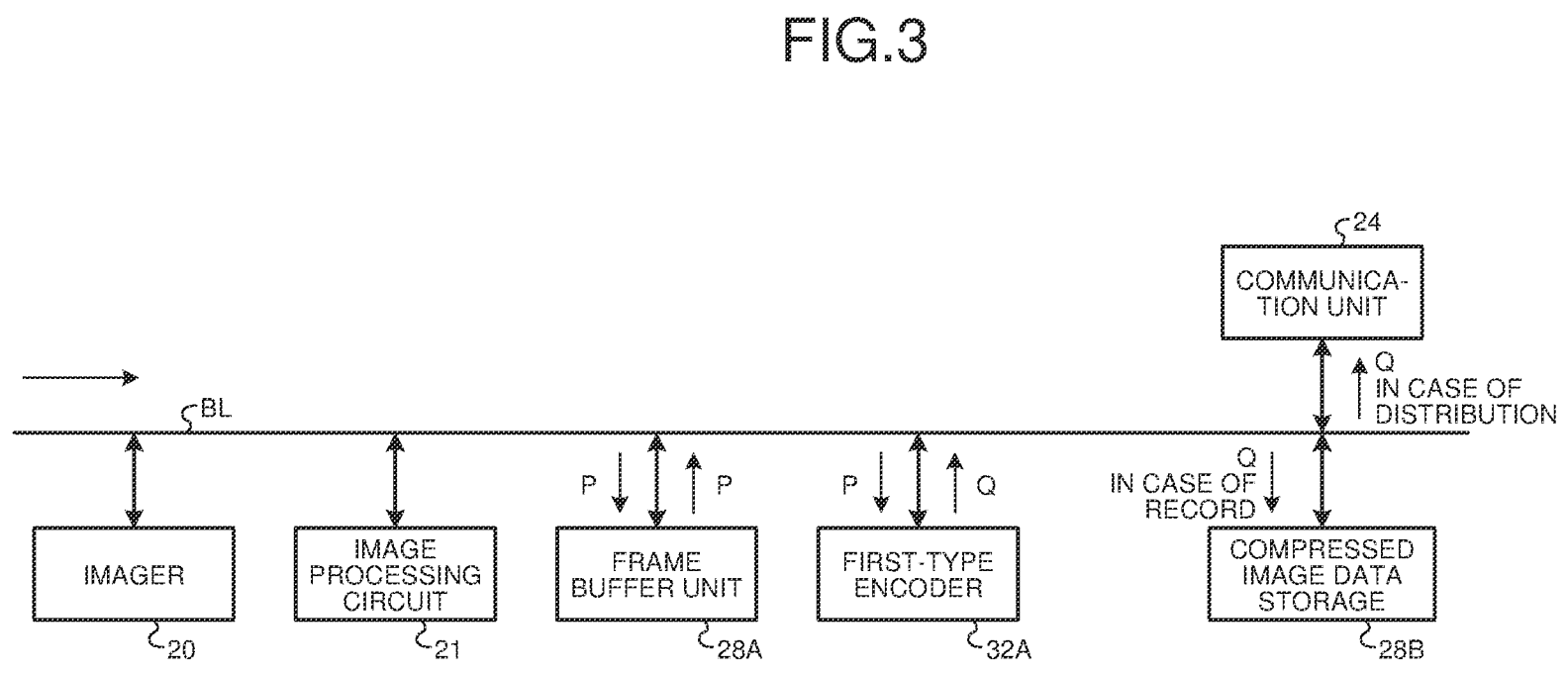

FIG. 3 is a diagram that schematically illustrates a flow of data in the imaging device according to the present embodiment. In FIG. 3, a flow of data along a bus line BL is schematically illustrated. During capturing the images by the imager 20, the controller 22 makes the encoder compress the image data P. The image data acquiring unit 42 of the controller 22 makes the imager 20 perform an imaging processing and acquires image signals. The image signals acquired by the imager 20 are transmitted to the image processing circuit 21, which then generates the image data P. The image data P generated by the image processing circuit 21 is temporarily stored in the frame buffer unit 28A. In the controller 22, when a new set of image data P in time series is acquired from the image processing circuit 21, the image data acquiring unit 42 deletes, from the frame buffer unit 28A, the oldest set of image data P in time series stored in the frame buffer unit 28A, and newly stores the new set of image data P in time series in the frame buffer unit 28A. The encoder controller 44 of the controller 22 controls an encoder to compress the image data P stored in the frame buffer unit 28A. In FIG. 3, an example in which the first-type encoder 32A is used as the encoder for compressing the image data P is described. However, the encoder for compressing the image data P is not limited to the first-type encoder 32A, and alternatively the second-type encoder 32B can be used. In a case of recording the compressed image data Q acquired in the imaging device 10, the compressed image data Q compressed by the encoder is stored in the compressed image data storage 28B of the storage 28. In a case of distributing the compressed image data Q, the compressed image data Q compressed by the encoder is transmitted by the data output unit 50 to an external device via the communication unit 24.

Setting of Encoder Switching Method

Figure 4:
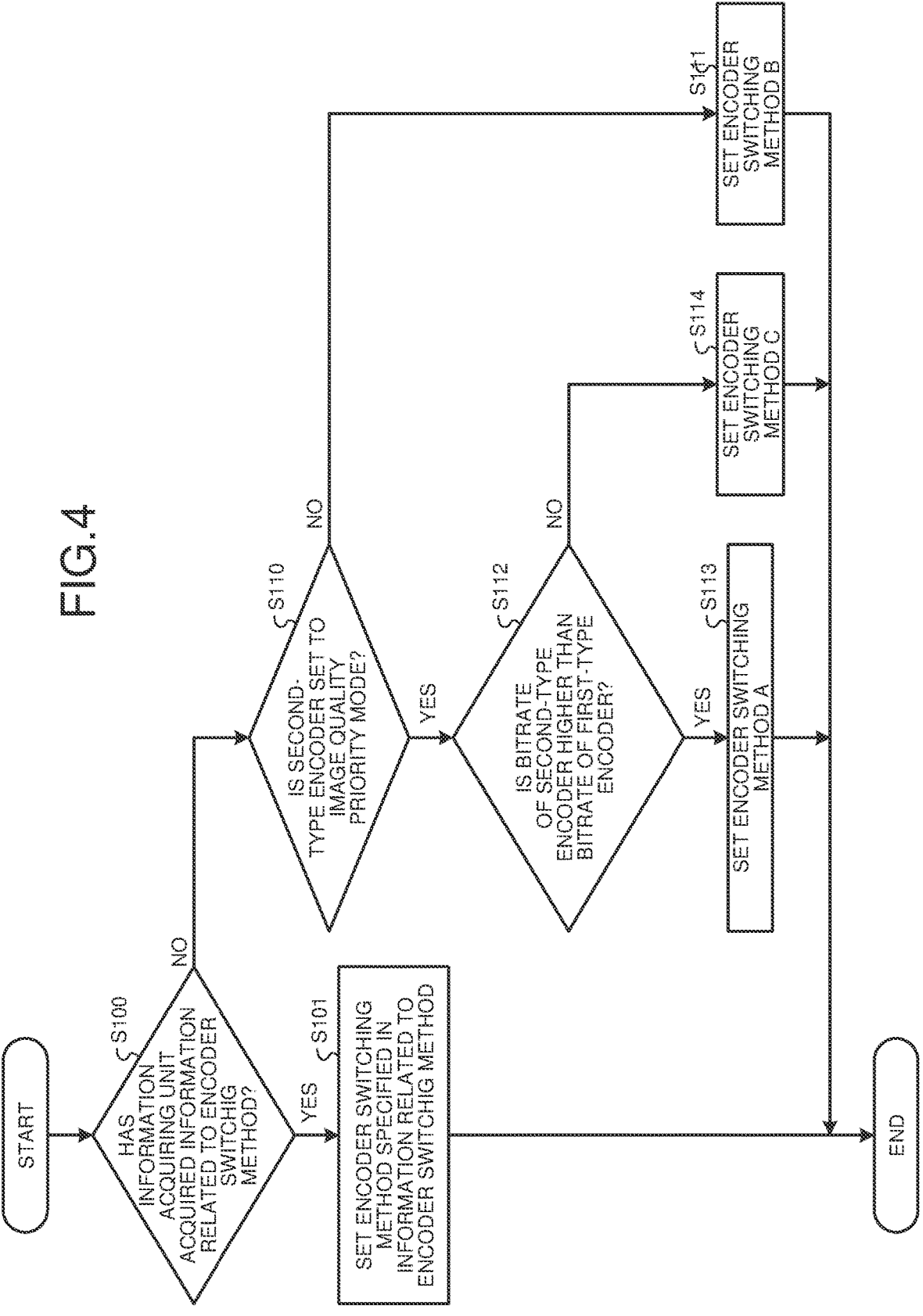
FIG. 4 is a flowchart for explaining a sequence for setting an encoder switching method in the imaging device according to the embodiment.

FIG. 4 is a flowchart for explaining a procedure for setting the encoder switching method in the imaging device according to the present embodiment. As explained above, based on the encoder switching information, the encoder type information, and the encoder information (i.e., the information related to the encoder operation mode, the information related to the video format, and the information related to the encoder switching method) acquired by the information acquiring unit 46, the selecting unit 48 of the controller 22 selects the encoder used for the record purpose and selects the encoder used for the distribution purpose. Herein, processes are explained in a case in which the information related to the encoder operation mode and the information related to the encoder switching method included in the encoder information are defined as illustrated in Table 1 and Table 2. Moreover, the first-type encoder functions according to H.264 standard, and the second-type functions according to H.265 standard which has twice a compression capability than H.264 standard and only half or less of the bitrate is sufficient in order to achieve the same image quality. Processes by the selecting unit 48 are explained below with reference to FIG. 4.

When the information acquiring unit 46 acquires the encoder switching information indicating that the compression can be performed by the second-type encoder, the selecting unit 48 confirms whether the information acquiring unit 46 has acquired the information related to the encoder switching method as the encoder information (Step S100). That is, the selecting unit 48 confirms whether the encoder switching method is specified. If the information acquiring unit 46 has acquired the information related to the encoder switching method (YES at Step S100), then the selecting unit 48 sets the encoder switching method specified in the information related to the encoder switching method as the encoder switching method for the imaging device 10 (Step S101).

For example, if the encoder switching method A illustrated in Table 2 is specified as the encoder switching method, then the selecting unit 48 selects the second-type encoder 32B for the record purpose and selects the first-type encoder 32A for the distribution purpose. In that case, the encoder controller 44 stores the compressed image data Q, which is generated by compressing the image data P by the second-type encoder 32B, in the compressed image data storage 28B. Moreover, the encoder controller 44 transmits the compressed image data Q, which is generated by compressing the image data P by the first-type encoder 32A, to an external device via a communication unit 24A. Alternatively, if the encoder switching method B illustrated in Table 2 is specified as the encoder switching method, then the selecting unit 48 selects the first-type encoder 32A for the record purpose and selects the second-type encoder 32B for the distribution purpose. In that case, the encoder controller 44 stores the compressed image data Q, which is generated by compressing the image data P by the first-type encoder 32A, in the compressed image data storage 28B. Moreover, the encoder controller 44 transmits the compressed image data Q, which is generated by compressing the image data P by the second-type encoder 32B, to an external device via the communication unit 24A. Still alternatively, if the encoder switching method C illustrated in Table 2 is specified as the encoder switching method, then the selecting unit 48 selects the second-type encoder 32B for the record purpose as well as for the distribution purpose. In that case, the encoder controller 44 stores the compressed image data Q, which is generated by compressing the image data P by the second-type encoder 32B, in the compressed image data storage 28B. Moreover, the encoder controller 44 transmits the compressed image data Q, which is generated by compressing the image data P by the second-type encoder 32B, to an external device via the communication unit 24A.

Meanwhile, if the information acquiring unit 46 has not acquired the information related to the encoder switching method (NO at Step S100), that is, if the encoder switching method is not specified, then the controller 22 decides on the encoder information based on the encoder information other than the encoder switching information. In that case, the selecting unit 48 confirms the information related to the encoder operation mode acquired by the information acquiring unit 46, and confirms whether the second-type encoder is set to the image quality priority mode (Step S110). Meanwhile, the encoder operation mode can be set by the user from the external input unit 26 to be stored in the storage 28, or can be stored in advance in the storage 28 of the imaging device 10. When multiple settings of the encoder operation mode are available, it is desirable that priority is set in order of the setting input by the user, the setting provided in advance in the imaging device 10, and the setting stored in the second compression circuit 30B. In that case, the information acquiring unit 46 acquires multiple sets of information related to the encoder operation mode. Then, according to the priority set in advance, from among the multiple sets of information related to the encoder operation mode acquired by the information acquiring unit 46, the selecting unit 48 decides the information related to the encoder operation mode which is to be used. For example, when multiple sets of information related to the encoder operation mode of the same encoder (herein, for example, the second-type encoder 32B) are set, then, according to the priority set in advance, the encoder operation mode applied for that encoder (herein, for example, the second-type encoder 32B) is decided. That is, when the imaging device 10 acquires first-type information related to the encoder operation mode for the second-type encoder 32B and second-type information related to the encoder operation mode for the second-type encoder 32B, the imaging device 10 follows the priority set in advance to decide on which should be used from among the first-type information and the second-type information. When a data format is set in advance in the imaging device 10, it is desirable that the data format is in a form of a correspondence table in which whether the image quality priority mode is set or not is defined for each type of the second-type encoder.

If the second-type encoder 32B is set as the image quality priority mode (YES at Step S110), then the selecting unit 48 confirms the information related to the video format acquired by the information acquiring unit 46 and confirms whether the bitrate of the second-type encoder 32B is higher than the bitrate of the first-type encoder (Step S112). If the bitrate of the second-type encoder 32B is higher than the bitrate of the first-type encoder (YES at Step S112), then the selecting unit 48 sets the encoder switching method A illustrated in Table 2 as the encoder switching method (Step S113). That is, the second-type encoder 32B set as the image quality priority mode is used for the record purpose, and the first-type encoder 32A having a lower bitrate than the second-type encoder 32B is used for the distribution purpose. As a result, the encoder having a better image quality is used for the record purpose, and the encoder having a lower bitrate is used for the distribution purpose. Thus, the encoders can be selected in an appropriate manner.

On the other hand, if the bitrate of the second-type encoder 32B is lower than the bitrate of the first-type encoder (NO at Step S112), then the selecting unit 48 sets the encoder switching method C illustrated in Table 2 as the encoder switching method (Step S114). That is, the second-type encoder 32B that is set as the image quality priority mode is used for the record purpose, and the second-type encoder 32B that has a lower bitrate than the first-type encoder 32A is also used for the distribution purpose. As a result, the encoder having a better image quality is used for the record purpose, and the encoder having a lower bitrate is used for the distribution purpose. Thus, the encoders can be selected in an appropriate manner.

At a time of comparing the bitrates at Step S112, since the compression capability of the second-type encoder 32B of H.255 standard according to the present embodiment is higher than that of the first-type encoder, the equivalent image quality can be achieved at the bitrate equal to or smaller than half of the bitrate of the first-type encoder. Hence, a double of the bitrate of the second-type encoder 32B can be compared with the bitrate of the first-type encoder 32A. For example, if the second-type encoder 32B has the bitrate of 10 Mbps, then the bitrate for comparison can be set to 20 Mbps (10 Mbps×2), and can be used for comparison with the bitrate of the first-type encoder 32A.

Meanwhile, if the second-type encoder 32B is not set as the image quality priority mode (including a case in which the image quality priority mode is not set) (NO at Step S110), then the selecting unit 48 sets the encoder switching method B illustrated in Table 2 as the encoder switching method (Step S111). That is, the second-type encoder 32B set as the low-delay mode is not used for the record purpose. Instead, the first-type encoder 32A is used for the record purpose, and the second-type encoder 32B set as the low-delay mode is used for the distribution purpose. As a result, the encoder having a better image quality is used for the record purpose, and the encoder having a lower delay is used for the distribution purpose. Thus, the encoders can be selected in an appropriate manner.

As explained above, even if the encoder switching method is not specified, the selecting unit 48 can select the encoder switching method for the imaging device 10 based on the encoder information and can appropriately set the encoders for the record purpose and for the distribution purpose. That is, in a case of attaching an additional detachable encoder in addition to the encoder included in the imaging device 10, the encoders can be switched appropriately according to a user request.

Configuration of Imaging Device, Non-Transitory Storage Medium, and Encoder Selection Method The imaging device 10 includes the imager 20 configured to capture images; the first-type encoder 32A configured to compress image data of the images captured by the imager 20; the connector unit C to which the second-type encoder 32B is connectible; the information acquiring unit 46 configured to acquire, when the second-type encoder 32B is connected to the connector unit C, encoder information which contains at least information on the second-type encoder 32B from the second-type encoder 32B; and the selecting unit 48 configured to select, based on the encoder information acquired by the information acquiring unit 46, an encoder used for a record purpose and an encoder used for a distribution purpose from among the first-type encoder 32A and the second-type encoder 32B.

With such a configuration, when the second-type encoder is connected to the imaging device that already includes the first-type encoder, the encoder used for the record purpose and the encoder used for the distribution purpose are selected based on the encoder information. Hence, the encoder can be selected in an appropriate manner.

The encoder information contains at least one of the information related to the encoder operation mode, the information related to the video format, and the information related to the encoder switching method.

With such a configuration, based on at least one of the information related to the encoder operation mode, the information related to the video format, and the information related to the encoder switching method, the encoder used for the record purpose and the encoder used for the distribution purpose are selected from the first-type encoder and the second-type encoder. Hence, the encoder can be selected in an appropriate manner.

The information related to the encoder operation mode contains a low-delay mode and an image quality priority mode in which an image quality is given higher priority than that in the low-delay mode but an encoding delay is longer than that in the low-delay mode, the selecting unit 48 is further configured to use, when the information related to the encoder operation mode for the second-type encoder 32B indicates the image quality priority mode, the second-type encoder 32B for the record purpose, and the selecting unit 48 is further configured to use, when the information related to the encoder operation mode for the second-type encoder 32B indicates the low-delay mode, the first-type encoder 32A for the record purpose and the second-type encoder 32B for the distribution purpose.

With such a configuration, if the information related to the encoder operation mode of the second-type encoder indicates the image quality priority mode, then the second-type encoder is used for the record purpose. On the other hand, if the information related to the encoder operation mode of the second-type encoder indicates the low-delay mode, then the first-type encoder is used for the record purpose and the second-type encoder is used for the distribution purpose. Thus, the encoder having the better image quality is used for the record purpose, and the encoder having the shorter delay is used for the distribution purpose. Hence, the encoder can be selected in an appropriate manner.

When the information related to the encoder operation mode of the second-type encoder 32B indicates the image quality priority mode, the selecting unit 48 is further configured to compare a bitrate of the first-type encoder 32A with a bitrate of the second-type encoder 32B, and the selecting unit 48 is further configured to use, when the bitrate of the second-type encoder 32B is higher than the bitrate of the first-type encoder 32A, the first-type encoder 32A for the distribution purpose, and the selecting unit 48 is further configured to use, when the bitrate of the second-type encoder 32B is equal to lower than the bitrate of the first-type encoder 32A, the second-type encoder 32B also for the distribution purpose.

With such a configuration, if the encoder operation mode of the second-type encoder indicates the image quality priority mode, the bitrate of the first-type encoder is compared with the bitrate of the second-type encoder and the encoder having the lower bitrate is used for the distribution purpose. Thus, the encoder having the better image quality is used for the record purpose, and the encoder having the shorter delay is used for the distribution purpose. Hence, the encoder can be selected in an appropriate manner.

A non-transitory storage medium that stores a computer program according to the embodiment causes a computer to execute: acquiring, when the second-type encoder 32B is connected to the imaging device 10 that includes the first-type encoder 32A, encoder information containing at least information on the second-type encoder 32B from the second-type encoder 32B, and selecting, based on the encoder information, an encoder used for a record purpose and an encoder used for a distribution purpose from among the first-type encoder 32A and the second-type encoder 22B.

With such a configuration, when the second-type encoder is connected to the imaging device that already includes the first-type encoder, the encoder used for the record purpose and the encoder used for the distribution purpose are selected based on the encoder information. Hence, the encoder can be selected in an appropriate manner.

An encoder selection method according to the embodiment includes: acquiring, when the second-type encoder 32B is connected to the imaging device 10 that includes the first-type encoder 32A, encoder information containing at least information on the second-type encoder 32B from the second-type encoder 32B, and selecting, based on the encoder information, an encoder used for a record purpose and an encoder used for a distribution purpose from among the first-type encoder 32A and the second-type encoder 32B.

With such a configuration, when the second-type encoder is connected to the imaging device that already includes the first-type encoder, the encoder used for the record purpose and the encoder used for the distribution purpose are selected based on the encoder information. Hence, the encoder can be selected in an appropriate manner.

According to the present application, an imaging device, a non-transitory storage medium, and an encoder selection method can be provided which can switch, when an additional detachable encoder is attached to the imaging device which includes an encoder, the encoders appropriately.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:
1. An imaging device comprising:
an imager configured to capture images;
a first-type encoder configured to compress image data of the images;

a connector unit to which a second-type encoder which is an external device and which is configured to compress the image data of the images is connectible;

an information acquiring unit configured to acquire, when the second-type encoder is connected to the connector unit, encoder information containing at least information on the second-type encoder from the second-type encoder; and a selecting unit configured to select, based on the encoder information, an encoder used for a record purpose and an encoder used for a distribution purpose from among the first-type encoder and the second-type encoder, wherein the encoder information contains at least information related to an encoder operation mode, the information related to the encoder operation mode contains a low-delay mode and an image quality priority mode in which an image quality is given higher priority than that in the low-delay mode and an encoding delay is longer than that in the low-delay mode, and the selecting unit is further configured to:

select, in response to determining that the information related to the encoder operation mode for the second-type encoder indicates the image quality priority mode, the second-type encoder as the encoder used for the record purpose; and select, in response to determining that the information related to the encoder operation mode for the second-type encoder indicates the low-delay mode, the first-type encoder as the encoder used for the record purpose and the second-type encoder as the encoder used for the distribution purpose.

2. The imaging device according to claim 1, wherein the information acquiring unit is further configured to, when multiple sets of the information related to the encoder operation mode can be acquired, acquire the multiple sets of the information related to the encoder operation mode, and the selecting unit is further configured to decide on the information related to the encoder operation mode used in the selecting unit according to a priority set in advance.

3. The imaging device according to claim 1, wherein the selecting unit is further configured to, in response to determining that the information related to the encoder operation mode of the second-type encoder indicates the image quality priority mode:

compare a bitrate of the first-type encoder with a bitrate of the second-type encoder, use, in response to determining that the bitrate of the second-type encoder is higher than the bitrate of the first-type encoder, the first-type encoder for the distribution purpose, and use, in response to determining that the bitrate of the second-type encoder is equal to or lower than the bitrate of the first-type encoder, the second-type encoder also for the distribution purpose.

4. A non-transitory storage medium that stores a computer program that causes a computer to execute:

acquiring, when a second-type encoder is connected to an imaging device that includes a first-type encoder, encoder information containing at least information on the second-type encoder from the second-type encoder, wherein the second-type encoder is an external device and is configured to compress image data of captured images; and selecting, based on the encoder information, an encoder used for a record purpose and an encoder used for a distribution purpose from among the first-type encoder and the second-type encoder, wherein the encoder information contains at least one of:

information related to an encoder operation mode, the information related to the encoder operation mode contains a low-delay mode and an image quality priority mode in which an image quality is given higher priority than that in the low-delay mode and an encoding delay is longer than that in the low-delay mode, and the selecting comprises;

selecting, in response to determining that the information related to the encoder operation mode for the second-type encoder indicates the image quality priority mode, the second-type encoder as the encoder used for the record purpose; and selecting, in response to determining that the information related to the encoder operation mode for the second-type encoder indicates the low-delay mode, the first-type encoder as the encoder used for the record purpose and the second-type encoder as the encoder used for the distribution purpose.

5. An encoder selection method comprising:

acquiring, when a second-type encoder is connected to an imaging device that includes a first-type encoder, encoder information containing at least information on the second-type encoder from the second-type encoder, wherein the second-type encoder is an external device and is configured to compress image data of captured images; and selecting, based on the encoder information, an encoder used for a record purpose and an encoder used for a distribution purpose from among the first-type encoder and the second-type encoder, wherein the encoder information contains at least one of:

information related to an encoder operation mode, the information related to the encoder operation mode contains a low-delay mode and an image quality priority mode in which an image quality is given higher priority than that in the low-delay mode and an encoding delay is longer than that in the low-delay mode, and the selecting comprises:

in response to determining that the information related to the encoder operation mode for the second-type encoder indicates the image quality priority mode, selecting the second-type encoder as the encoder used for the record purpose; and in response to determining that the information related to the encoder operation mode for the second-type encoder indicates the low-delay mode, selecting the first-type encoder as the encoder used for the record purpose and the second-type encoder as the encoder used for the distribution purpose.

* * * * *